United States Patent
McBeath et al.

(10) Patent No.: US 7,580,713 B2
(45) Date of Patent: Aug. 25, 2009

(54) APPARATUS AND METHOD FOR ESTABLISHING AN ACTIVE SET OF CARRIERS FOR A RECEIVER

(75) Inventors: Sean M. McBeath, Keller, TX (US); Hao Bi, Lake Zurich, IL (US); Danny T. Pinckley, Arlington, TX (US); John D. Reed, Arlington, TX (US); Jack A. Smith, Valley View, TX (US)

(73) Assignee: Motorola, Inc., Schaumburg, IL (US)

( * ) Notice: Subject to any disclaimer, the term of this patent is extended or adjusted under 35 U.S.C. 154(b) by 159 days.

(21) Appl. No.: 11/127,433

(22) Filed: May 12, 2005

(65) Prior Publication Data

US 2006/0281465 A1    Dec. 14, 2006

(51) Int. Cl.
 *H04W 72/00* (2006.01)
(52) U.S. Cl. .................. 455/450; 455/452.1
(58) Field of Classification Search .......... 455/450–453
See application file for complete search history.

(56) References Cited

U.S. PATENT DOCUMENTS

| 6,208,858 B1* | 3/2001 | Antonio et al. ............. 455/429 |
| 6,611,493 B1* | 8/2003 | Miyashita et al. ........... 370/208 |
| 2001/0038616 A1* | 11/2001 | Fong et al. .................. 370/329 |
| 2002/0019236 A1* | 2/2002 | Thompson et al. .......... 455/452 |
| 2005/0059401 A1 | 3/2005 | Chen et al. |
| 2006/0221894 A1* | 10/2006 | Casaccia et al. ............. 370/328 |

* cited by examiner

*Primary Examiner*—Lester Kincaid
*Assistant Examiner*—Steven Lim
(74) *Attorney, Agent, or Firm*—Gary J. Cunningham

(57) ABSTRACT

A method and apparatus for establishing an active set of carriers from a plurality of available carriers for a wireless receiver. The active set of carriers can be determined from the plurality of available carriers for the wireless receiver. An indication of which carriers are in the active set can be sent to the wireless receiver, such as a receiver in a mobile communication device. The receiver or mobile communication device can monitor only those carriers that are listed in the active set of carriers.

12 Claims, 6 Drawing Sheets

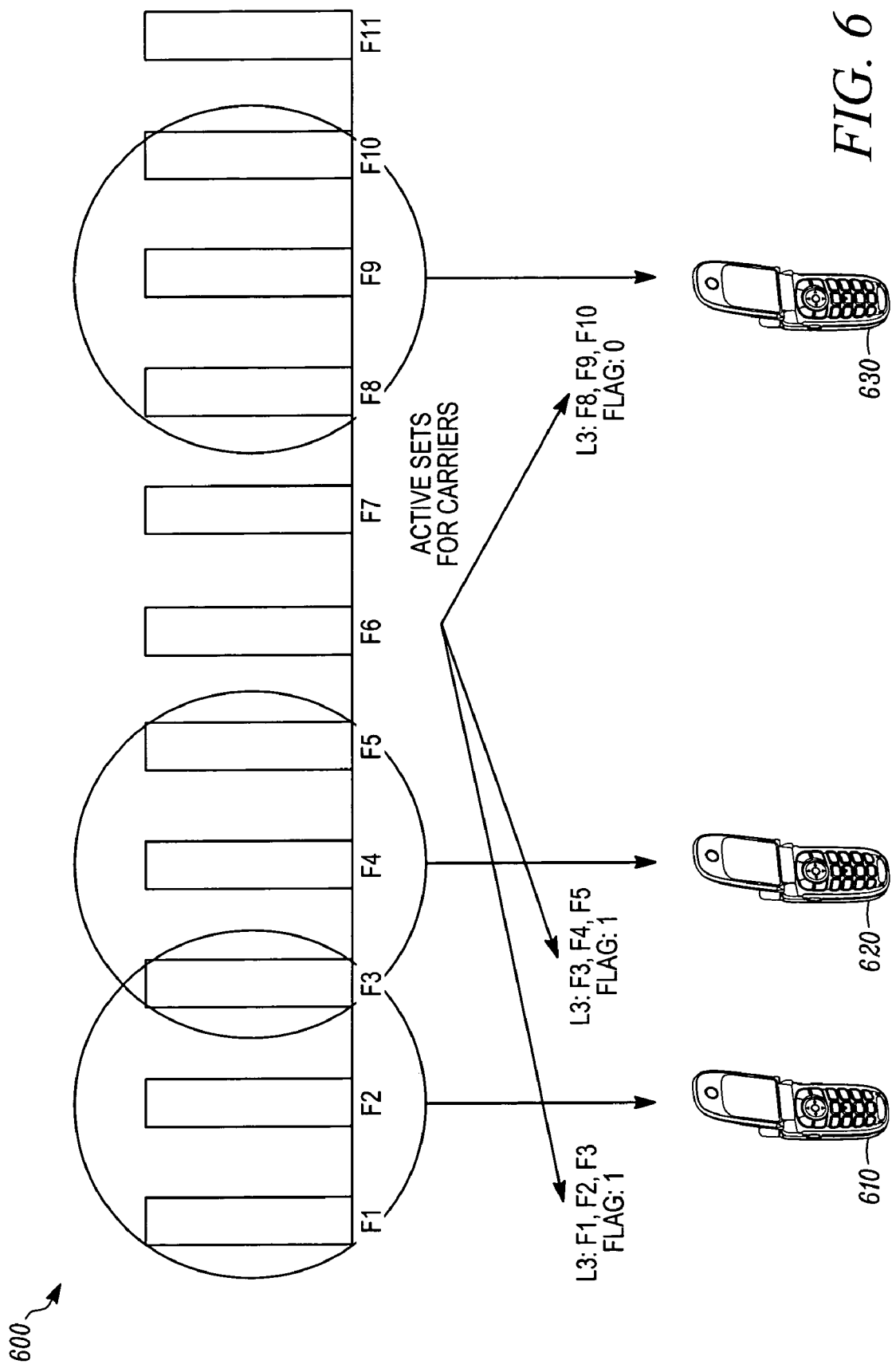

APPARATUS AND METHOD FOR ESTABLISHING AN ACTIVE SET OF CARRIERS FOR A RECEIVER

BACKGROUND

1. Field

The present disclosure is directed to a method and apparatus for establishing an active set of carriers for a receiver. More particularly, the present disclosure is directed to establishing an active set of carriers from a plurality of available carriers for a wireless receiver.

2. Description of Related Art

Presently, a base station or terminals in a wireless network can transmit to and receive information from a mobile station on a single carrier. For example, a carrier can be a channel occupying a fixed bandwidth on a wireless local area network, a wireless wide area network, such as a code division multiple access (CDMA) network or a time division multiple access (TDMA) network, or any other wireless network. Unfortunately, the use of a single carrier can be limiting. For example, a single carrier can limit the transmission of data, can limit the available bandwidth, or can cause other limitations.

It may be possible to increase the number of transmission carriers to a plurality of carriers. Thus, more carriers can be used if more resources are required for transmission to and from a mobile station. In such a system, the mobile station must monitor all the carriers for its unique identifier in order to receive data. Examples of such channels can include a forward data traffic channel (F-DTCH), a forward packet data channel (F-PDCH), a high speed downlink shared channel (HS-DSCH), a preamble of F-DTCH, a forward packet data control channel (F-PDCCH), a high speed downlink shared control channel (HS-DSCCH), and the like. Unfortunately, monitoring of all carriers can cause problems at the mobile station. For example, monitoring and decoding all carriers can cause problems such as unnecessary battery drain, requirement of an unnecessarily complex receiver capable of receiving all carriers, or can cause other problems when it is not necessary to transmit on all carriers to the mobile station.

Thus, there is a need for a method and apparatus for establishing an active set of carriers for a receiver.

SUMMARY

The present disclosure is directed to establishing an active set of carriers from a plurality of available carriers for a wireless receiver. The active set of carriers can be determined from the plurality of available carriers for the wireless receiver. An indication of which carriers are in the active set can be sent to the wireless receiver, such as a receiver in a mobile communication device. The receiver or mobile communication device can then monitor only those carriers that are listed in the active set of carriers.

BRIEF DESCRIPTION OF THE DRAWINGS

The embodiments of the present disclosure will be described with reference to the following figures, wherein like numerals designate like elements, and wherein:

FIG. 6 is an exemplary illustration of the establishment of an active set of carriers for different receivers according to another related embodiment.

DETAILED DESCRIPTION

Figure 1:
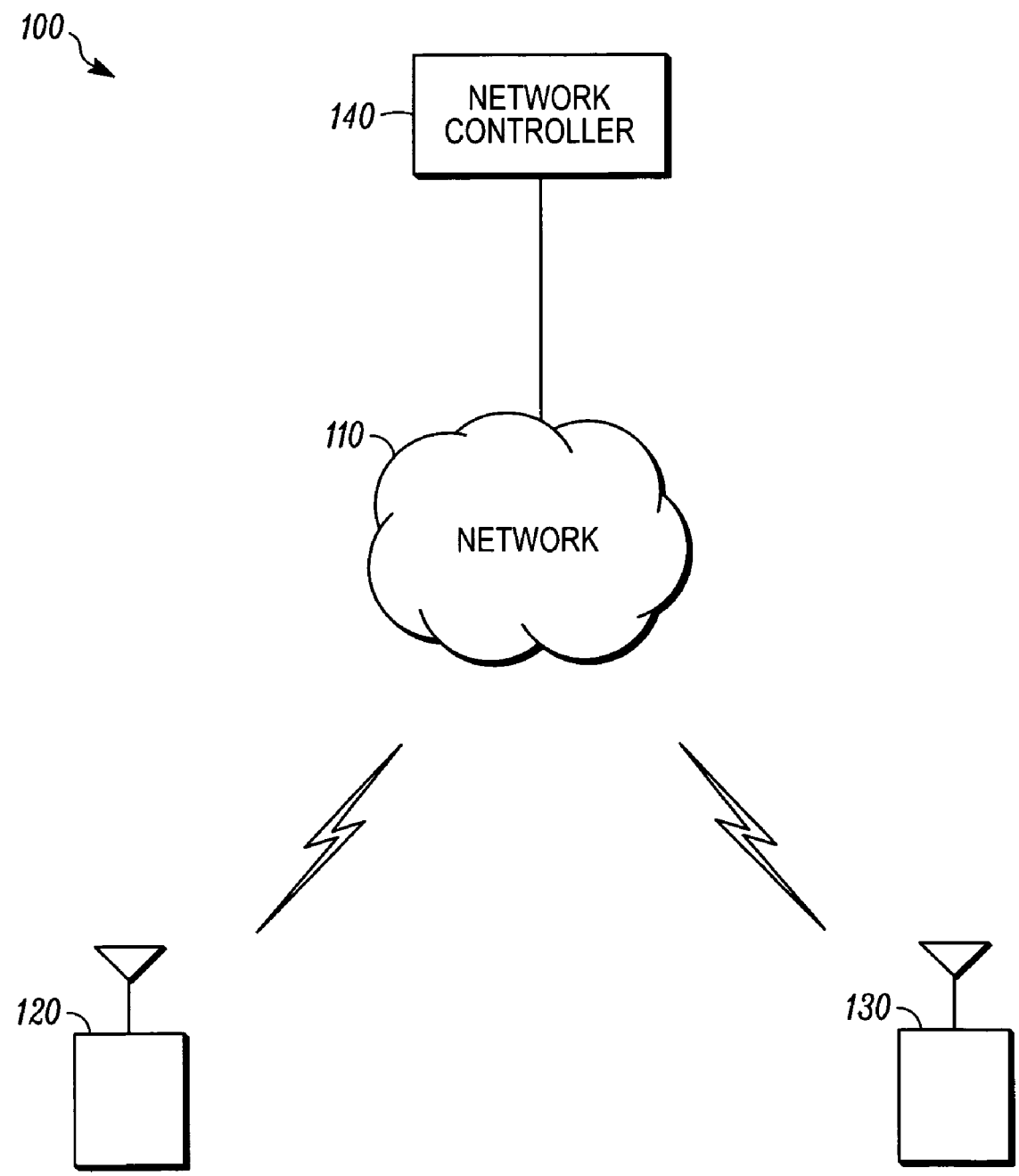
FIG. 1 is an exemplary block diagram of a system according to one embodiment.

FIG. 1 is an exemplary block diagram of a system 100 according to one embodiment. The system 100 can include a network controller 140, a network 110, and one or more terminals 120 and 130. Terminals 120 and 130 may be wireless communication devices such as wireless receivers, wireless telephones, cellular telephones, personal digital assistants, pagers, personal computers, mobile communication devices, or any other device that is capable of sending and receiving communication signals on a wireless network.

In an exemplary embodiment, the network controller 140 is connected to the network 110. The controller 140 may be located at a base station, at a radio network controller, or anywhere else on the network 110. The network 110 may include any type of network that is capable of sending and receiving wireless signals. For example, the network 110 may include a wireless telecommunications network, a cellular telephone network, a satellite communications network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals.

In operation, the network controller 140 can establish an active set of carriers from a plurality of available carriers for a wireless receiver 120 by determining the active set of carriers from the plurality of available carriers for the wireless receiver 120 and sending an indication of which carriers are in the active set to the wireless receiver 120. For example, the network controller 140 can be located at a base station and can send the indication using a layer three signaling message. A carrier can be a channel occupying a fixed bandwidth. One member of the active set of carriers can be identified as a primary carrier.

The network controller 140 can initialize a timer when a transmitter at the network controller transmits data to the receiver on the carrier. The network controller 140 can then remove at least one carrier from the active set of carriers, with the exception of the primary carrier, when the timer is greater than or equal to a threshold. The network controller 140 can also transmit a flag to the receiver. The flag may be a binary flag, may be a three-state flag, may include more than one bit to indicate numerous settings, or may be any other useful indicator. One state of the flag can indicate that, when the wireless receiver 120 receives a transmission, it will encompass an entire active set of carriers. Another state of the flag can indicate that the wireless receiver 120 will receive transmissions on any combination of members of the active set of carriers. One state can further indicate that the transmitter will encode one packet and will then distribute the packet among the entire active set of carriers. In another embodiment, a different flag is sent to the receiver. One state can indicate that the transmitter will encode packets and then distribute them among at least one carrier and another state of the flag can indicate that the transmitter will encode separate packets on each carrier. For example, the flag can be used to describe the spreading or not of a packet data channel, for example, where the spreading is done by distributing data across a plurality of carriers. The network controller 140 can also determine at least one carrier to add to the active set of carriers of the wireless receiver and signal an indication of which carriers are to be added to the active set to the wireless receiver.

The active set of carriers for the receiver can be chosen such that the anticipated load on each carrier is approximately equal, based on pilot strength measurements made at the receiver 120, based on interference on particular carriers, or based on any other useful information. The pilot strength measurements can be received from the wireless receiver 120 as part of a RouteUpdate message. The number of active carriers for the receiver 120 can also be chosen according to the capabilities of the receiver 120. Additionally, a contiguous nature of the carriers or the carriers' individual bandwidths can be used to choose the set of active carriers according to the capabilities of the receiver 120. Furthermore, the indication of which carriers are in the active set can be contained in a TrafficChannelAssignment message.

For example, each terminal 120 and 130 can be assigned an active set of carriers. The active set can be signaled to the terminals 120 and 130 using a layer three signaling message in advance of sending or receiving the F-PDCCH and F-PDCH, where the F-PDCCH can be any channel used to carry information about the F-PDCH. The F-PDCCH may be on a different Walsh code, in a different time slot, sent as a preamble to the F-PDCH, or the like. For example, in 3GPP2 1×EV-DV, the F-PDCCH and F-PDCH correspond directly to the F-PDCCH and F-PDCH, respectively. In 3GPP2 1×EV-DO, the F-PDCCH and F-PDCH correspond to the preamble of the F-TCH and F-TCH, respectively. In 3GPP, the F-PDCCH and F-PDCH correspond to the HS-DSCH and HS-DSCCH, respectively. Other systems can have similar corresponding signals. With an active set of carriers, a terminal 120 can know which carriers can potentially carry the relevant F-PDCCH and F-PDCH, so the terminal 120 does not need to monitor all carriers in the system 100. Further, this can allow a base station to switch from one carrier to another (or exclude or include carriers,) on a frame by frame basis, which can allow intelligent scheduling at the base station. Also, one member of the active set of carriers can be the primary carrier, where voice and certain overhead channels can be sent to the terminal 120. Additionally, a flag can be sent to the terminal 120. The flag may be a binary flag where one state of the flag can indicate that the terminal 120 can receive the F-PDCCH and F-PDCH on all carriers within the active set simultaneously. The other state of the flag, the default state, can indicate that the terminal 120 can receive the F-PDCCH and F-PDCH on a subset of the active carrier set. In one embodiment, the subset can be defined at the same time as the flag is defined. In another embodiment, the subset can be the primary member of the active set. The flag can reduce decoding complexity by indicating to the terminal 120 how the data will be transmitted. If the terminal 120 moves into a cell that no longer has one of the assigned carriers, a new layer three message can be transmitted. If the primary carrier is maintained, the default state of the flag can be used until a new layer three signaling message arrives.

As an example of another embodiment, a "timeout" timer can be used, so that if a member of the active set of carriers is not used before the timeout expires, then that carrier can be removed from the set and not assigned until a new layer three signaling message reactivates it again.

By combining an active set of carriers with a flag indicating how data will be transmitted, transmission of F-PDCCH and F-PDCH can be facilitated in a dynamic scaleable bandwidth configuration. Among other benefits, this can also allow dynamic scaleable bandwidth without the need to add new physical layer channels. It further can allow the base station to switch carriers quickly.

Figure 2:
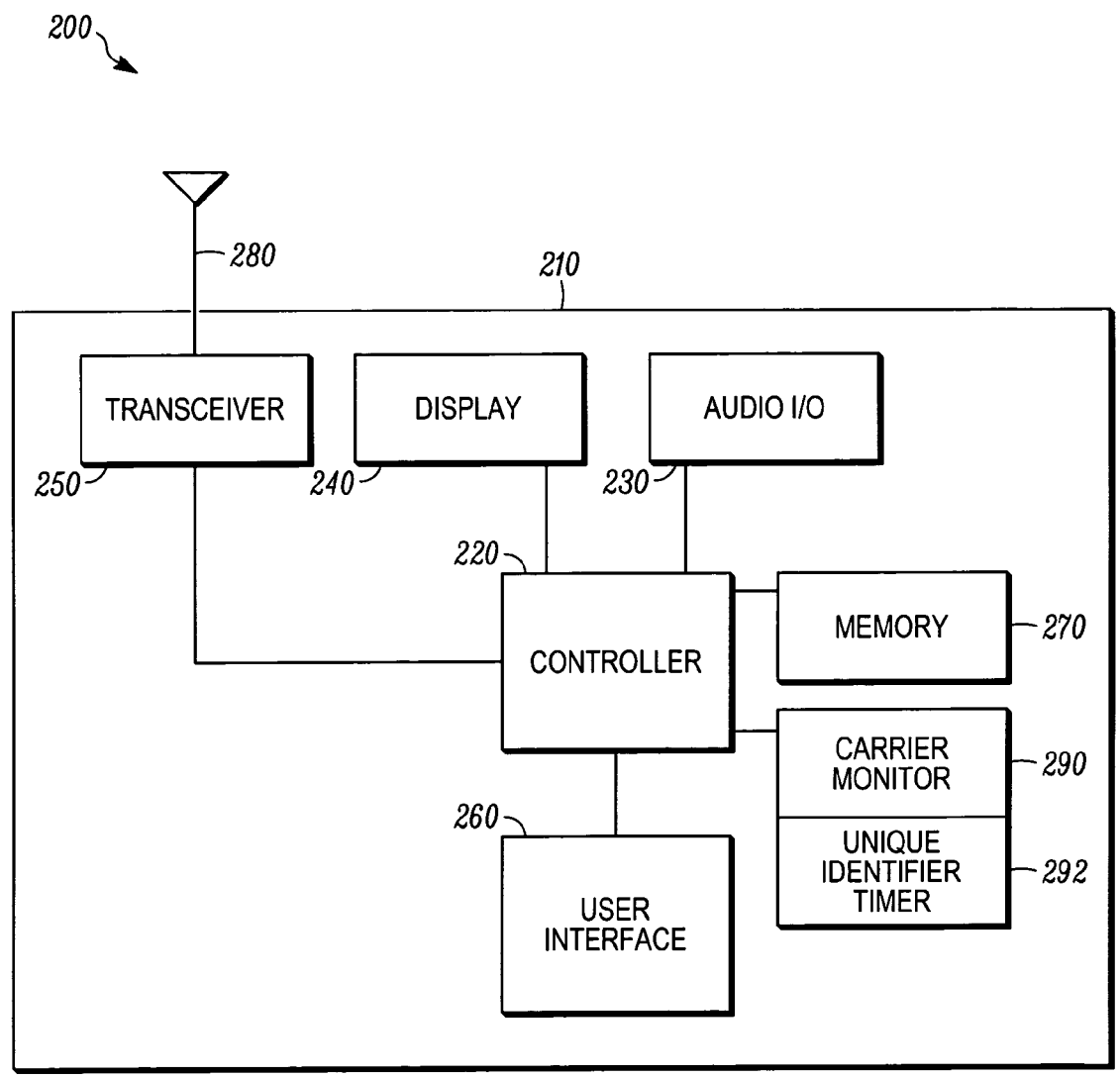
FIG. 2 is an exemplary block diagram of a wireless communication device according to one embodiment.

FIG. 2 is an exemplary block diagram of a wireless communication device 200, such as the terminal 120 or the terminal 130, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and an antenna 280 coupled to the housing 210 and the transceiver 250. The wireless communication device 200 can also include a carrier monitor 290 and a unique identifier timer 292. The carrier monitor 290 and the unique identifier timer 292 can be coupled to the controller 220, can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a wireless communication device.

In operation, the controller 220 can control the operations of the wireless communication device. The transceiver 250 can include a receiver configured to receive an indication of which carriers of the plurality of available carriers are included in the active set of carriers from a transmitter. For example the indication can be received in a layer 3 signaling message. The carrier monitor 290 can monitor only those carriers that are listed in the active set of carriers.

For example, the carrier monitor 290 can monitor those carriers which are listed in the active set of carriers for its unique identifier. The unique identifier can be a mobile communication device or mobile station identification number, a subscriber identity, or any other identifier that can be used to uniquely identify a terminal on a channel or carrier. For example, the unique identifier can be a medium access control identifier (MAC-ID), and there may be different unique identifiers for the terminal on each channel. The controller 220 can then decode packets on carriers where the unique identifier is found. For example, a terminal 120 can monitor a forward packet data control channel (F-PDCCH) or the preamble of the a forward data channel (F-DCH) to determine if a transmission on a forward packet data channel (F-PDCH) or a F-DCH at a particular time instant is intended for the terminal 120. When a unique identifier of the F-PDCCH or that of the F-DCH preamble matches the terminal's unique identifier, the terminal 120 can know to decode the F-PDCH or the F-DCH. The unique identifier timer 292 can be initialized for each carrier after the unique identifier is detected on a carrier. The unique identifier timer 292 may be a clock, a counter, or any other means of determining a period between events. In an alternative embodiment, a number of packets to be sent on a carrier may be communicated to the terminal and used to indicate when a carrier may be removed from the active set. For example, the carrier may be removed after receiving a predetermined number of packets.

The controller 220 can then remove at least one carrier from the active set of carriers, with the exception of a primary carrier, when the unique identifier timer 292 reaches a threshold. The controller 220 can also decode control channels, broadcast channels, or multi-user packets, or the like on the carriers in its active set.

Also, the transceiver 250 can receive an indication of which carriers of the plurality of available carriers have been added to the active set of carriers. The controller 220 can then take the union of the current active set and the said indication to get a new active set and the carrier monitor 290 can monitor only those carriers which are listed in the new active set of carriers. Thus, the carriers can be set once during a call or can change during a call.

Figure 3:
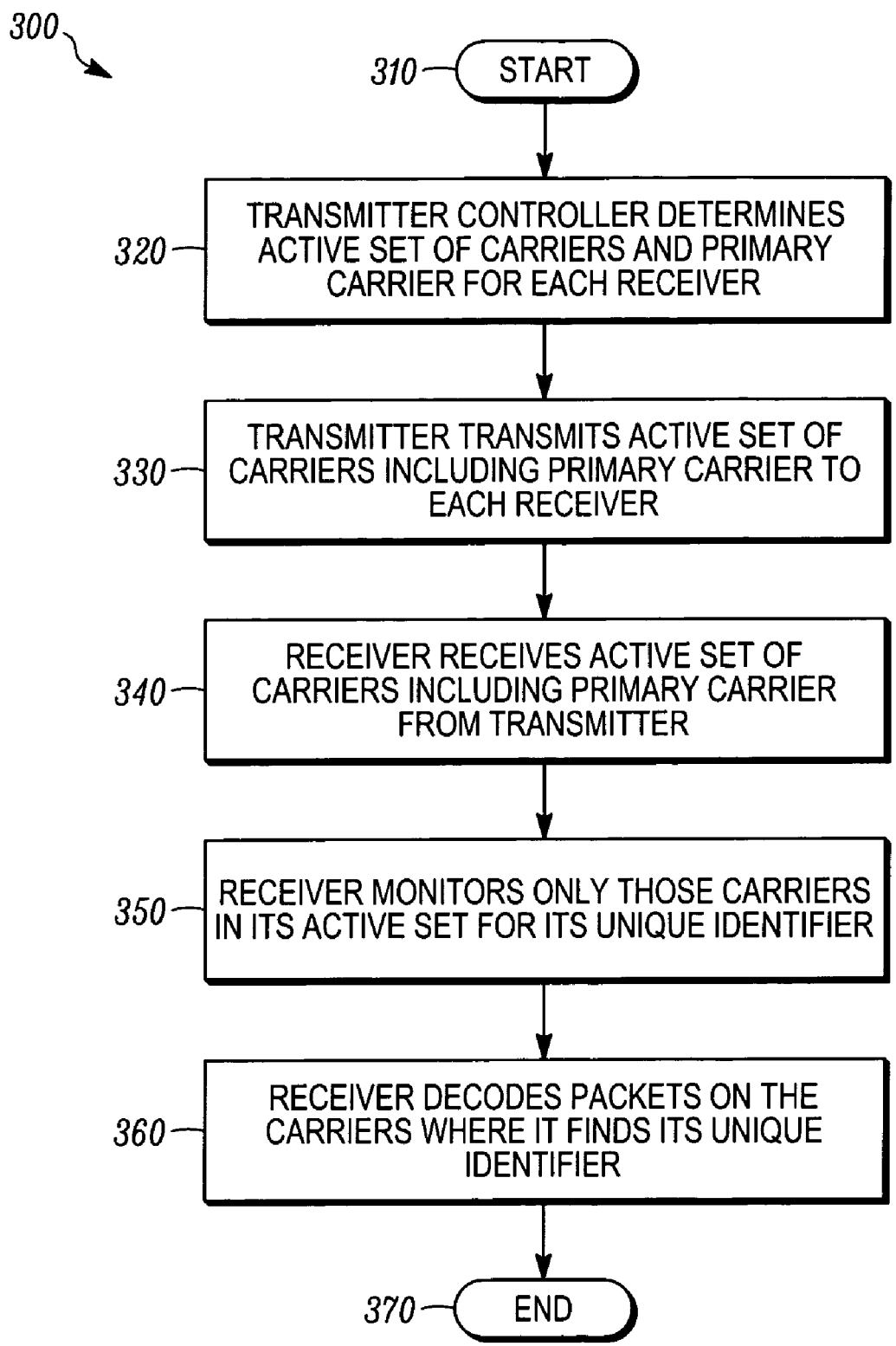
FIG. 3 is an exemplary flowchart illustrating the operation of a transmitter at a network controller or at a terminal according to another embodiment.

FIG. 3 is an exemplary flowchart 300 illustrating the operation of a transmitter at the network controller 140 or at a terminal 120 according to another related embodiment. In step 310, the flowchart begins. In step 320, a transmitter, such as one in the network controller 140 located at a base station, can determine an active set of carriers including a primary carrier for each receiver, such as at terminals 120 and 130. In step 330, the transmitter can transmit an indication of the active set of carriers including the primary carrier to each receiver. In step 340, each receiver can receive an indication of the active set of carriers including the primary carrier from the transmitter. In step 350, each receiver can monitor only those carriers in its active set for its unique identifier. In step 360, each receiver can decode packets on the carriers where it finds its unique identifier. In step 370, the flowchart 300 ends.

Figure 4:
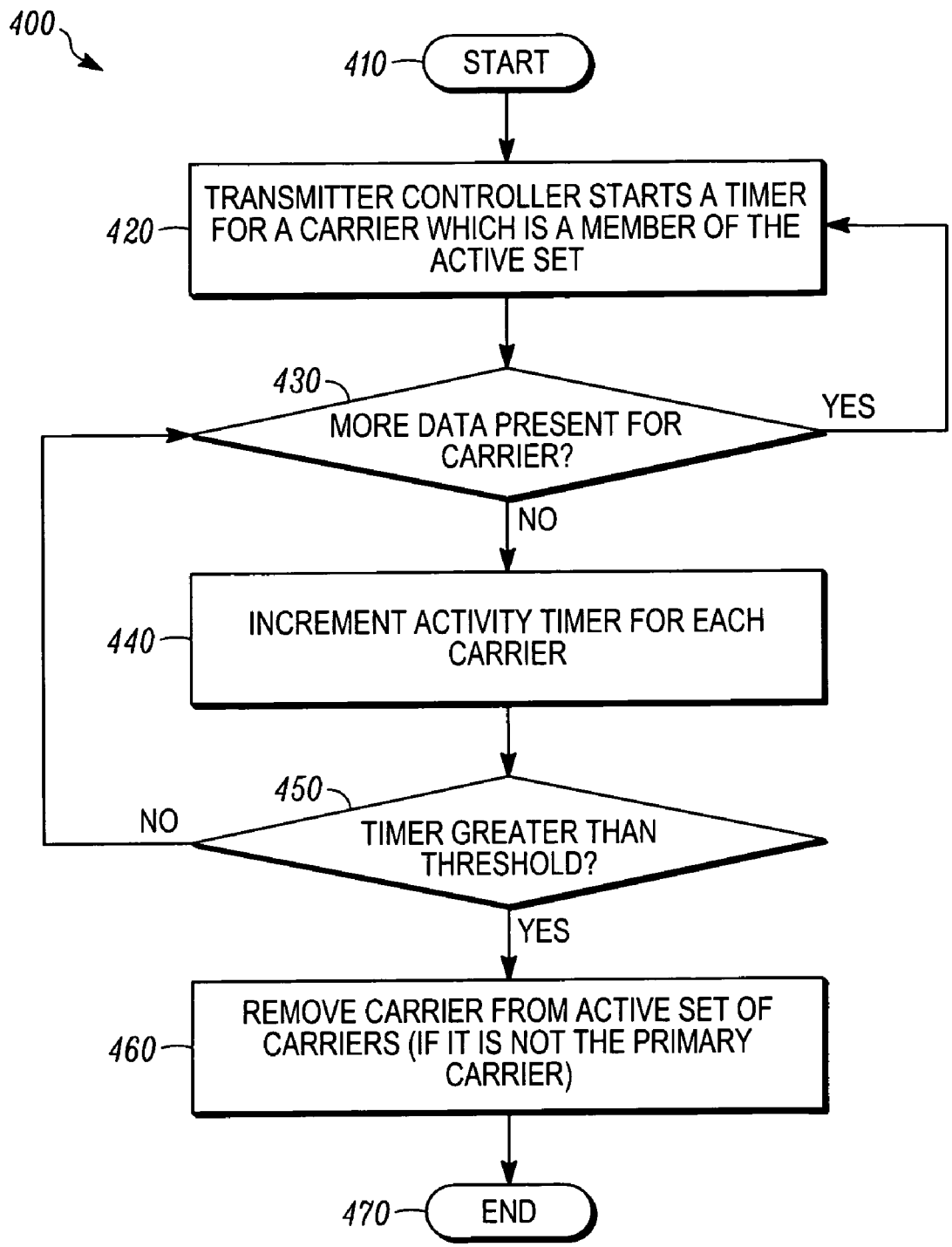
FIG. 4 is an exemplary flowchart illustrating the operation of a transmitter at a network controller or at a terminal according to another related embodiment.

FIG. 4 is an exemplary flowchart 400 illustrating the operation of a transmitter at the network controller 140 or at a terminal 120 according to another related embodiment. In step 410, the flowchart begins. In step 420, a transmitter, such as one in the network controller 140 located at a base station, can start a timer for a carrier which is a member of an active set of carriers. For example, the transmitter may start the timer based on when the active set list is transmitted, when data on the carrier is transmitted, when data on a primary carrier is transmitted, or at any other useful time for each receiver. All the carriers may have one timer, each carrier may have its own timer, or one timer may be associated with the primary carrier or the entire active set of carriers, or any other configuration may be used. Also, each carrier may have different thresholds with each timer associated with the carrier. For example, when data is transmitted on any one carrier, all the timers may restart. In step 430, the transmitter determines if more data is present for a carrier. If so, the transmitter can restart the timer in step 420. If not, in step 440, the transmitter can increment the timer for each carrier. In step 450, the transmitter determines if the timer is greater than a threshold. If not, the flowchart 400 returns to step 430. If the timer is greater than a threshold, in step 460, the transmitter can remove a carrier from the active set of carriers if it is not the primary carrier. In step 470, the flowchart ends.

Figure 5:
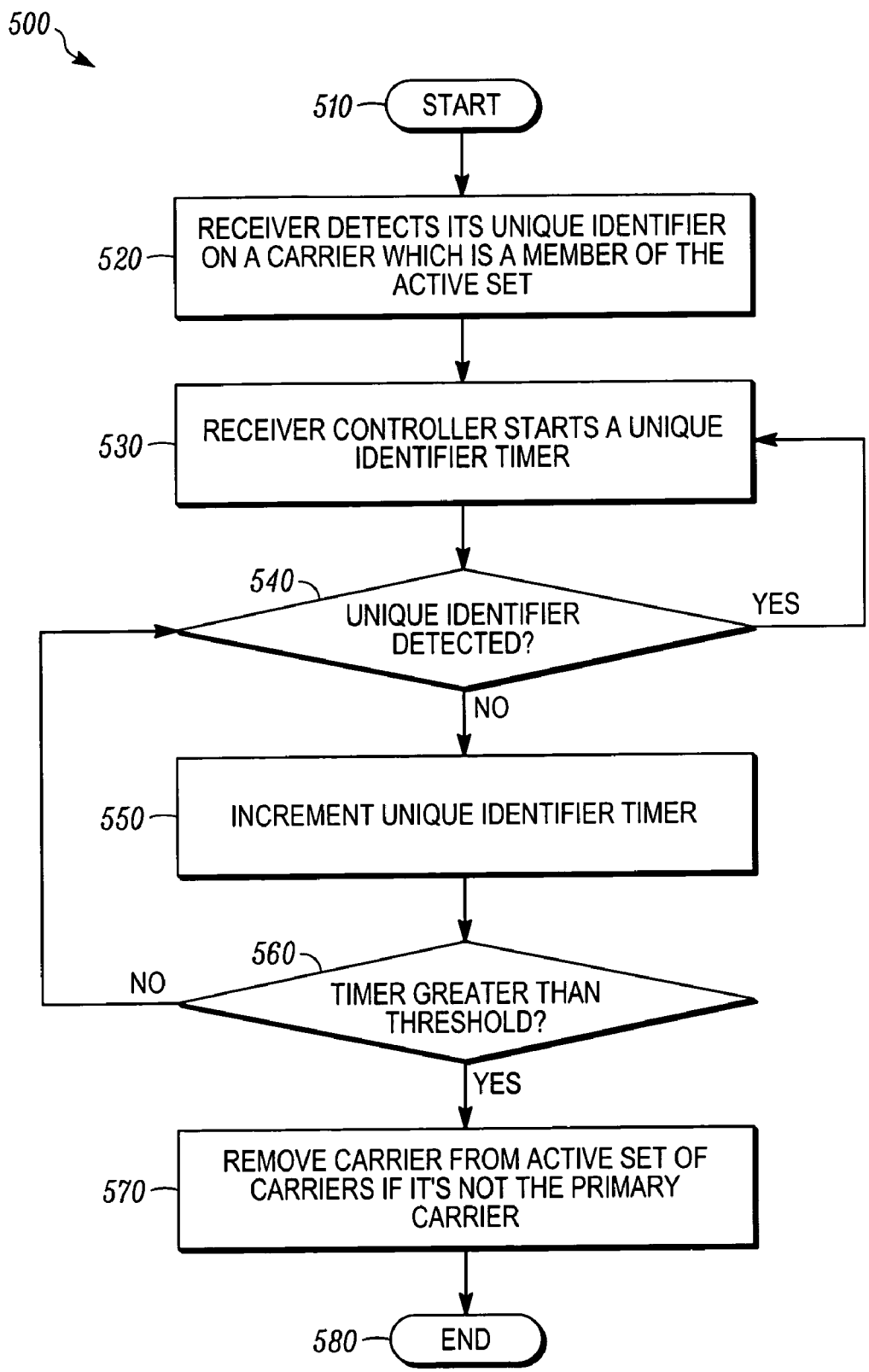
FIG. 5 is an exemplary flowchart illustrating the operation of a receiver at a terminal according to another related embodiment.

FIG. 5 is an exemplary flowchart 500 illustrating the operation of a receiver at a terminal 120 or 130 according to another related embodiment. In step 510, the flowchart begins. In step 520, the receiver can detect its unique identifier on a carrier which is a member of the active set. In step 530, the receiver controller, such as the controller 220, can start a timer, such as the unique identifier timer 292, for each or all carriers which are members of the active set of carriers. In step 540, the receiver, the controller 220, or a carrier monitor 290 located at or with the receiver determines if the receiver's unique identifier has been detected. If so, the receiver restarts the unique identifier timer 292 in step 530. If not, in step 550, the receiver increments the unique identifier timer 292. In step 560, the receiver determines if the unique identifier timer 292 is greater than a threshold. If not the flowchart returns to step 540. If the unique identifier timer 292 is greater than a threshold, in step 570, the receiver removes the carrier from the active set of caters if the carrier is not the primary carrier. In step 580, the flowchart ends.

FIG. 6 is an exemplary illustration 600 of the establishment of an active set of carriers for different receivers according to another related embodiment. The active set of carriers can include carriers f1-f11. Sets of the active carriers can be assigned to different terminals 610, 620, and 630, such as terminal 120 and 130. For example, carriers f1-f3 can be assigned to terminal 610, carriers f3-f5 can be assigned to terminal 620, and carriers f8-f10 can be assigned to terminal 630. It is not necessary to assign adjacent carriers to each terminal. For example, carriers f1, f5, and f7 can be assigned to terminal 610 (not shown in the figure). Also, any number of carriers can be assigned to each terminal ranging from no carriers, one carrier, all carriers, and any number in between depending on factors such as bandwidth requirements, terminal capability, system limitations, and any other useful factors. Furthermore, each terminal may utilize one or more flags to indicate how data is to be received across the active set of carriers.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

What is claimed is:

1. A method for a wireless communication device to employ an active set of carriers from a plurality of available carriers, the method comprising:

receiving, from a network controller, an indication of which carriers of the plurality of available carriers are included in the active set of carriers;

monitoring only carriers that are listed in the active set of carriers for a unique identifier of the wireless communication device, the active set of carriers including a primary carrier for transmitting at least overhead information;

decoding packets on carriers in the active set that contain the unique identifier of the wireless communication device;

starting a unique identifier timer for at least one carrier in the active set of carriers after detecting the unique identifier on the at least one carrier;

determining whether the unique identifier timer has reached a threshold prior to receipt of the unique identifier again on the at least one carrier;

if the unique identifier timer has reached the threshold prior to receipt of the unique identifier again on the at least one carrier, removing a carrier other than the primary carrier from the active set of carriers; and if the unique identifier timer has not reached the threshold prior to receipt of the unique identifier again on the at least one carrier, restarting the unique identifier timer.

2. The method according to claim 1, further comprising decoding at least one of control channels, broadcast channels, and multi-user packets on carriers in the active set of carriers.

3. The method according to claim 1, further comprising:
receiving an indication of which carriers of the plurality of available carriers have been added to the active set of carriers;
determining a union of the active set and the carriers identified in said indication to get a new active set of carriers; and
monitoring only those carriers which are listed in the new active set of carriers.

4. The method of claim 1, wherein the active set of carriers includes at least one carrier included in a second active set of carriers established for a second wireless communication device.

5. A wireless communication device comprising:
a receiver configured to receive an indication of which carriers of a plurality of available carriers are included in an active set of carriers;
a carrier monitor configured to monitor only carriers that are listed in the active set of carriers for a unique identifier of the wireless communication device and to decode packets on carriers in the active set that contain the unique identifier of the wireless communication device, the active set of carriers including a primary carrier for communicating at least overhead information; and
a controller coupled to the receiver and the carrier monitor, the controller configured to start a unique identifier timer for at least one carrier in the active set of carriers after die carrier monitor has detected the unique identifier on the at least one carrier, determine whether the unique identifier timer has reached a threshold prior to receipt of the unique identifier again on the at least one carrier, remove a carrier other than the primary carrier from the active set of carriers if the unique identifier timer has reached the threshold prior to receipt of the unique identifier again on the at least one carrier, and restart the unique identifier timer if the unique identifier timer has not reached the threshold prior to receipt of the unique identifier again on the at least one carrier.

6. The wireless communication device according to claim 5, wherein the controller decodes at least one of control channels, broadcast channels, and multi-user packets on carriers in the active set.

7. The wireless communication device according to claim 5,
wherein the receiver is further configured to receive a new indication of which carriers of the plurality of available carriers have been added to the active set of carriers,
wherein the controller is further configured to determine a union of the active set of carriers and the carriers identified in the new indication to get a new active set of carriers, and
wherein the carrier monitor is further configured to monitor only those carriers which are listed in the new active set of carriers.

8. The wireless communication device of claim 5, wherein the active set of carriers includes at least one carrier included in a second active set of carriers established for a second wireless communication device.

9. A method of employing an active set of carriers from a plurality of available carriers, the method comprising:
determining, by a network controller, the active set of carriers from the plurality of available carriers, the active set of carriers including a primary carrier for transmitting at least overhead information;
sending, by the network controller, a message to a wireless communication device identifying the active set of carriers;
transmitting, by the network controller, a flag to the wireless communication device, wherein the flag indicates how packets will be encoded and transmitted on the active set of carriers to facilitate monitoring of the active set of carriers by the wireless communication device;
starting, by the network controller, an inactivity timer upon transmission of a packet to the wireless communication device on at least one carrier in the active set;
determining, by the network controller, whether the inactivity timer has reached a first threshold prior to transmission of another packet on the at least one carrier;
if the inactivity timer has reached the first threshold prior to transmission of another packet, removing, by the network controller, a carrier other than the primary carrier from the active set of carriers;
if the inactivity timer has not reached the first threshold prior to transmission of another packet, restarting, by the network controller, the inactivity timer;
receiving, by the wireless communication device, the message;
monitoring, by the wireless communication device, only carriers that are listed in the active set of carriers for a unique identifier of the wireless communication device;
decoding, by the wireless communication device, packets on carriers in the active set that contain the unique identifier of the wireless communication device;
starting, by the wireless communication device, a unique identifier timer for the at least one carrier after detecting the unique identifier on the at least one carrier;
determining, by the wireless communication device, whether the unique identifier timer has reached a second threshold prior to receipt of the unique identifier again on the at least one carrier;
if the unique identifier timer has reached the second threshold prior to receipt of the unique identifier again on the at least one carrier, removing, by the wireless communication device, a carrier other than the primary carrier from the active set of carriers; and
if the unique identifier timer has not reached the second threshold prior to receipt of the unique identifier again on the at least one carrier, restarting, by the wireless communication device, the unique identifier timer.

10. The method of claim 9, wherein the first threshold is lower than the second threshold.

11. The method of claim 9, wherein the active set of carriers includes at least one carrier included in a second active set of carriers established for a second wireless communication device.

12. The method according to claim 9, further comprising:
- receiving, by the wireless communication device, an indication of which carriers of the plurality of carriers have been added to the active set of carriers;
- determining, by the wireless communication device, a union of the active set and the carriers identified in said indication to get a new active set of carriers; and
- monitoring, by the wireless communication device, only those carriers which are listed in the new active set of carriers.

* * * * *